No. 714,003.　　　　　　　　　　　　　　　　　　Patented Nov. 18, 1902.
C. W. MARSHALL.
CONTINUOUS INDEX LEDGER, TRIAL BALANCE, AND BALANCE SHEET BOOK COMBINED.
(Application filed Apr. 5, 1902.)

(No Model.)　　　　　　　　　　　　　　　　　　3 Sheets—Sheet 1.

No. 714,003. Patented Nov. 18, 1902.
C. W. MARSHALL.
CONTINUOUS INDEX LEDGER, TRIAL BALANCE, AND BALANCE SHEET BOOK COMBINED.
(Application filed Apr. 5, 1902.)
(No Model.) 3 Sheets—Sheet 2.
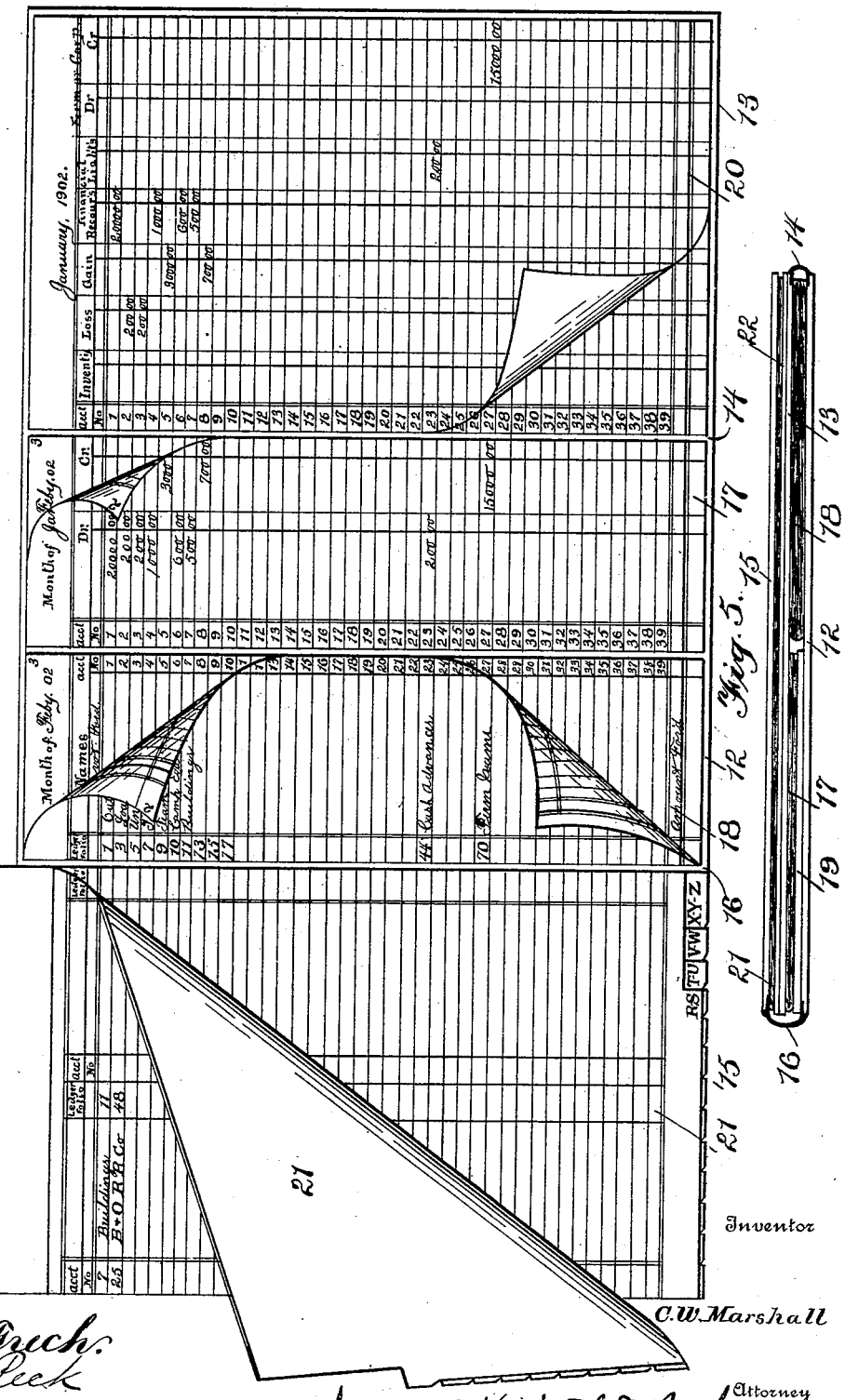
Witnesses
Geo. E. French
E. R. Peck
Inventor
C. W. Marshall
by Hubert E. Peck, Attorney

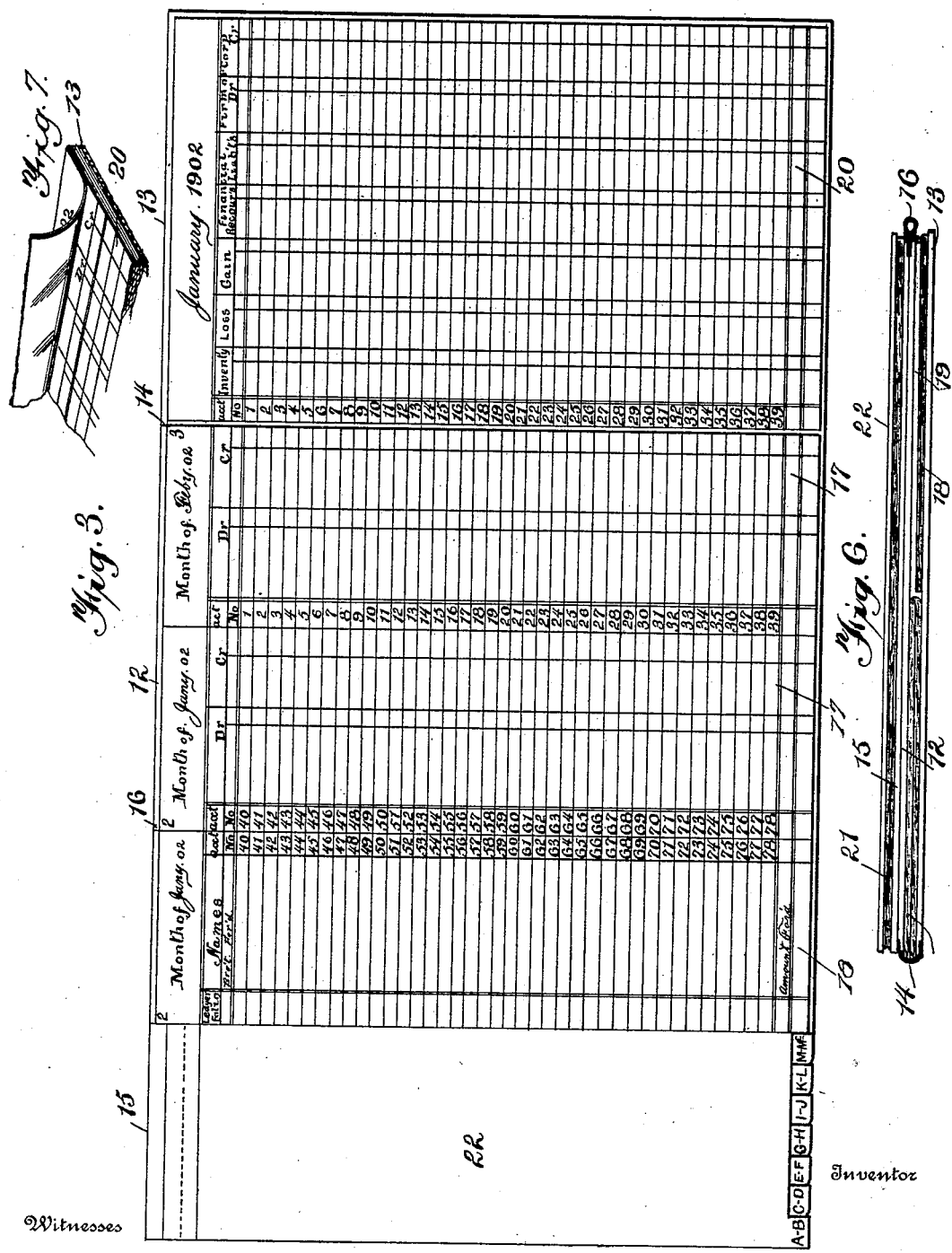

UNITED STATES PATENT OFFICE.

CHARLES W. MARSHALL, OF GREENWICH, OHIO.

CONTINUOUS-INDEX LEDGER, TRIAL-BALANCE, AND BALANCE-SHEET BOOK COMBINED.

SPECIFICATION forming part of Letters Patent No. 714,003, dated November 18, 1902.

Application filed April 5, 1902. Serial No. 101,588. (No model.)

*To all whom it may concern:*

Be it known that I, CHARLES W. MARSHALL, a citizen of the United States, residing at Greenwich, Huron county, State of Ohio, have invented certain new and useful Improvements in a Continuous-Index Ledger, Trial-Balance, and Balance-Sheet Book Combined; and I do hereby declare the following to be a full, clear, and exact description of the invention, such as will enable others skilled in the art to which it appertains to make and use the same.

This invention relates to account-books, and more particularly to an index-ledger, trial-balance, and balance-sheet combined in a single book.

The object of this invention is to provide a form of book in which the balances on the ledger-accounts may be entered for a long series of months without having to enter the title of the ledger-account but once and in connection therewith to provide a balance-sheet for showing the general financial statement, and, further, an alphabetical index of the ledger-names for use in connection with the balance-account and that may also serve as an index to the ledger proper.

Broadly stated, my invention comprises an intermediate backing-sheet having a backing-sheet hinged to each vertical margin, the intermediate sheet carrying a set of leaves containing the ledger-names and also another set of leaves arranged to be brought consecutively opposite the ledger-names on the other set, one of the other backing-sheets carrying one or more balance-sheets for financial statements and the third backing-sheet carrying a suitable index; and my invention comprises such further details of construction and arrangement, either separately or in combination, as will be described hereinafter and then particularly pointed out in the claims.

In the accompanying drawings, representing an account-book embodying one form of my invention, Figure 1 shows the account-book opened out flat. Fig. 2 shows the book with certain sheets partly turned. Fig. 3 shows the book with certain sheets turned over. Fig. 4 is an end view of the book as shown in Fig. 1. Fig. 5 represents an end view of the book in its closed position. Fig. 6 shows the several parts folded so as to bring the index portion on top. Fig. 7 is a detail perspective view of a portion of my book, showing the manner of hinging the balance-sheets along their top or upper edges.

Referring now to the accompanying drawings, in which the characters of reference indicate the same parts in the several views, 12 indicates the intermediate backing-sheet, that may be of any suitable material, such as cardboard or fiber, and which has a backing-sheet 13 attached thereto by hinge 14. A backing-sheet 15 is attached to the backing-sheet 12 by hinge 16. These hinges may be made of cloth, leather, or any suitable material. The three backing-sheets are preferably of the same dimensions.

A set of leaves 17 of about the same width as the backing-sheet 12 are secured along their middle vertical line to the backing-sheet 12 at its middle vertical line. Thus each of the sheets will form two leaves each about half of the width of the backing-sheet.

One or more sheets 18, preferably of the same dimensions as the sheets 17, are fastened along their middle vertical line to the backing-sheet 12, adjacent the left-hand margin of the backing-sheet. Thus each sheet 18 will form two similar leaves that are similar to the leaves of the sheet 17. From Figs. 1 and 4 it will be seen that when the leaves 17 and 18 are folded so that the front page of each leaf is uppermost the right-hand margin of a leaf 18 is adjacent the left-hand margin of a leaf 17. Fig. 3 shows the relative position of the leaves 17 and 18 when the first leaf 18 is turned over to bring its back page uppermost, and thereupon the first leaf 17 is turned over on top of the second leaf 18 to bring its back page uppermost. It will be observed that there is a relative arrangement of the pages in the two sets of leaves 17 and 18 in the position shown in Fig. 2 that is identical with that shown in Fig. 1—that is, the right-hand margin of the page of a leaf 18 is still adjacent the left-hand margin of a page of a leaf 17. In Fig. 1, the front pages of the leaf are numbered "1," while in Fig. 3, the back page of each first leaf is numbered "2."

If the first two leaves of the sheet 18 are turned over and then the first leaf of the sheet 17 is turned over and thereupon the second leaf of the sheet 18, that was just turned over, is turned back on top of page 2 of the leaves 17, page 3 of leaves 18 will be adjacent page 3 of leaves 17, with the right-hand margin of the former page adjacent the left-hand margin of the latter page, and if the first two sheets 18 are folded over page 4 of these leaves will be uppermost, and thereupon turning over the first two leaves of the other set will bring page 4 of the latter uppermost, with the right-hand margin of page 4 of the set of leaves 18 adjacent the left-hand margin of page 4 of the set of leaves 17. The latter position of the leaves will be similar to that shown in Fig. 3, page 2 in each set being supplanted by page 4.

The several pages of the leaves 18 have horizontal rulings for containing the names or titles of the several accounts in a ledger. The pages of the set of leaves 17 contain horizontal rulings preferably similar to and registering with the rulings of the other set of leaves. These pages also contain one or more vertical rulings, thus dividing them into columns, one of which may be designated the "Dr." column, the other the "Cr." column. The object of this is to show the balance debit or credit, as the case may be, at the end of a given stated period, usually a calendar month. For example, the ledger-names may be entered on page 1 and the balances for the month of January entered on page 1 of the balance-sheets. Thereupon the first balance-sheet is turned over and inserted between pages 1 and 3 of the leaves 18, which will bring page 3 of the balance-sheet to register with page 1 of the sheet of names. Then at the end of the next month the balances for the same names can be inserted on page 3 without the necessity of again entering the ledger-names, and for each successive month a leaf is simply turned over underneath the page containing the index-names; but when the list of ledger-names requires more than one page of the set of leaves 18 page 1 is filled up and then turned over and the list continued on page 2 of the set of leaves 18, and, if necessary, the list is continued on pages 3 and 4 of this set, or, in fact, any number may be used, according to the number in the list of names.

Now when the list of names is contained on several pages, as just described, the balance for the month of January of the names on page 1 are entered on page 1 of the balance-leaves, as just described and as shown in Fig. 1. Thereupon page 1 of the names is turned over to bring page 2 of the names in view, and then the first leaf of the balance-pages is turned over, which will bring page 2 of the latter to register with page 2 containing the index-names, as indicated in Fig. 3, and the balances for the names on page 2 are then put down on balance-page 2. Thereupon balance-page 3 is brought to register with page 3, containing the index-names, and the corresponding balances inserted. In the same manner the succeeding pages of names are brought to register with succeeding balance-pages until the entire list of names have their balances posted for the said month. Then to post the balances for the list of names on the several pages for the succeeding month the first blank balance-page—for instance, page 5, supposing that four balance-pages have been filled—is brought to register with page 1, containing the list of index-names, and the balances posted thereon. Thereupon page 2 of the list of names is brought to register with balance-page 6 and the latter posted, then page 3 posted on balance-page 7, and page 4 on balance-page 8. For the third month balance-page 9 will be posted from name-index page 1, balance-page 10 from page 2, 11 from 3, and 12 from 4, and so for each succeeding month a new list of balance-pages is posted from the same set of index-name pages for a number of months, limited only by the capacity of the book.

In the views I have shown a vertical column along each margin of the index-name pages. When the book is first brought into use, the names are preferably entered from the ledger from its beginning, and the folio or page of the ledger from which the names are taken is put down in the left-hand column. The several names are numbered *seriatum* as put down, which is the account-number, and is inserted in the right-hand column of the several pages. The left-hand margin of each balance-sheet has a vertical column containing numbers corresponding with the account-numbers of the several index-names.

A number of sheets of thick paper or cardboard 19 are secured to the backing-sheet 12 underneath the leaves 18, as shown in Fig. 4. Since for one set of names on the leaves 18 there are a large number of balances to be entered on the leaves 17, there will be a far greater number of the balance-leaves than of the others. The object of these sheets 19 is to raise the leaves 18 so that they will be approximately level with the balance-leaves. Then as the balance-leaves are turned over underneath the index-name leaves from month to month the height of the balance-leaves will diminish, while that of the other set of leaves will be raised. The strips 19 are then removed as required to preserve the level of the two sets of sheets.

On the backing-sheet 13, at its upper part, are hinged a number of leaves 20, having horizontal rulings corresponding to and registering with the rulings on the balance-sheet 17. These leaves 20 are intended to segregate the several balances on the adjacent pages under a few general headings. There is a left-hand vertical column for containing the account-number similar to that on the balance-pages, and the remainder of the sheet is divided into a number of vertical columns. For example, the first column may be devoted to an inventory. The next two columns may represent the loss and gain, rerespectively, in which columns the several items that constitute a loss or gain in the business are entered on these columns opposite their respective account-numbers, and then if one sheet represents a month's account corresponding with a single balance-sheet adjacent the two columns can be added and the result put at the bottom of the page, with also the total balance of loss or gain, as the case may be. There may be another pair of columns in which the resources and liabilities are set down opposite their respective account-numbers, and a pair of columns showing the debit or credit of the firm or corporation may also be used. When the balance-items for a month require more than one page of the leaves 17, an equal number of the leaves 20 are used, and as each leaf is turned over its footings are carried forward onto the succeeding leaf.

On the backing-sheet 15 a number of leaves 21 are hinged at the upper part. These leaves are suitably ruled to contain an alphabetical index of the ledger names or titles. Suitable columns are provided, so that the ledger folio or page and also the account-number corresponding with that on the leaves 18 may be entered opposite each of the ledger-names. These leaves are preferably alphabetically indexed, projecting along the lower margin, so that the page containing a desired name may be readily found.

The index-leaves 21 have a suitable rigid cover 22 hinged, preferably, at the same place with the leaves, which lies on top of the leaves and protects them when they are not in use and further serves to keep them in place when their backing-sheets are turned forward.

The hinge 16 is made considerably wider than the hinge 14. When it is desired to close the book, the backing-sheet 13 is first turned over onto the backing-sheet 12 and then the index-sheet 15 folded over on top of the backing-sheet 13, as shown in Fig. 5.

The ledger portion of the book may also be used simply as an index for the ledger itself, in which case the book is folded by first turning the backing-sheet 13 over onto the backing-sheet 12 and thereupon turning the index-sheet on its hinge in the opposite direction from that in which it was turned to bring the book into the position shown in Fig. 5. This latter operation will bring the back of the sheet 15 in contact with the back of the sheet 12, and the book may be placed as shown in Fig. 6, in which the cover 21 of the index portion is uppermost, while the back of sheet 13 will rest on the table or support.

Having thus described my invention, what I claim, and desire to secure by Letters Patent, is—

1. In an account-book, the combination of a backing-sheet, a set of leaves attached to the backing-sheet along a vertical intermediate line and extending to one vertical margin of the sheet, a set of leaves attached to the backing-sheet along the opposite vertical margin and extending to said intermediate vertical line, whereby said former sheets may be folded over onto said latter sheets, a second backing-sheet hinged to said backing-sheet along said first-mentioned vertical margin and a set of leaves hinged to said latter backing-sheet along its upper horizontal portion.

2. In an account-book, the combination of a backing-sheet, a set of leaves attached to the backing-sheet along a vertical intermediate line and extending to one vertical margin of the sheet, a set of leaves attached to the backing-sheet along the opposite vertical margin and extending to said vertical intermediate line, whereby said former sheets may be folded over onto said latter sheets, a second backing-sheet hinged to said backing-sheet along said first-mentioned vertical margin, and a set of balance-leaves hinged to said latter backing-sheet along its upper horizontal portion, said latter sheet having horizontal rulings and a plurality of columns, the front pages of said vertically-hinged leaves having horizontal rulings that register along said intermediate vertical line, and that also register with said horizontal rulings of the balance-sheets, the back pages of said vertically-hinged sets of leaves having horizontal rulings that register along one of said vertical margins.

3. In an account-book, the combination of a backing-sheet, a set of leaves attached to the backing-sheet along a vertical intermediate line and extending to one vertical margin of the sheet, a set of leaves attached to the backing-sheet along the opposite vertical margin and extending to said vertical intermediate line, whereby said former sheets may be folded over onto said latter sheets, a second backing-sheet hinged to said backing-sheet along said first-mentioned vertical margin, and a set of balance-leaves hinged to said latter backing-sheet along its upper horizontal portion, said latter sheets having horizontal rulings and a plurality of columns, the front pages of said vertically-hinged leaves having horizontal rulings that register along said intermediate vertical line, and that also register with said horizontal rulings of the balance-sheets, the back pages of said vertically-hinged sets of leaves having horizontal rulings that register along one of said vertical margins, the said set of leaves adjacent the balance-sheets having on each side vertical columns for the account-numbers and for the debit and credit balances, the set of leaves not adjacent the balance-sheet having on each side vertical columns for the ledger-folio the account-name and the account-number.

4. In an account-book, the combination of a backing-sheet, a set of leaves attached to the backing-sheet along a vertical intermediate line and extending to one vertical margin of the sheet, a set of leaves attached to the backing-sheet along the opposite vertical margin and extending to said vertical intermediate line, whereby said former sheets may be folded over onto said latter sheets, a second backing-sheet hinged to said backing-sheet along said first-mentioned vertical margin, and a set of balance-leaves hinged to said latter backing-sheet along its upper horizontal portion, said latter sheets having horizontal rulings and a plurality of columns, the front pages of said vertically-hinged leaves having horizontal rulings that register along said intermediate vertical line, and that also register with said horizontal rulings of the balance-sheets, the back pages of said vertically-hinged sets of leaves having horizontal rulings that register along one of said vertical margins, the said set of leaves adjacent the balance-sheets having on each side vertical columns for the account-numbers and for the debit and credit balances, the set of leaves not adjacent the balance-sheet having on each side vertical columns for the ledger-folio the account-name and the account-number, and a third backing-sheet hinged to the backing-sheet containing the two sets of leaves along a vertical margin, and a plurality of index-sheets hinged to said latter sheet along its upper horizontal portion.

In testimony whereof I affix my signature in presence of two witnesses.

CHARLES W. MARSHALL.

Witnesses:
S. A. HEWLING,
BELLE M. MARSHALL.